(12) United States Patent
Levy

(10) Patent No.: US 10,188,155 B2
(45) Date of Patent: Jan. 29, 2019

(54) GARMENT COMPRISING A MODULE WITH A REMOVABLE ELECTRONIC DISPLAY, FASTENED TO THE GARMENT THROUGH SUPPLE MAGNETIC MEANS

(71) Applicant: PARROT SHMATES, Paris (FR)

(72) Inventor: Olivier Levy, Paris (FR)

(73) Assignee: WEAR TRBL, Paris (FR)

( * ) Notice: Subject to any disclaimer, the term of this patent is extended or adjusted under 35 U.S.C. 154(b) by 303 days.

(21) Appl. No.: 15/279,311

(22) Filed: Sep. 28, 2016

(65) Prior Publication Data

US 2017/0099885 A1 Apr. 13, 2017

(30) Foreign Application Priority Data

Oct. 8, 2015 (FR) ..................... 15 59557

(51) Int. Cl.
*G06F 1/16* (2006.01)
*A41D 1/00* (2018.01)
(Continued)

(52) U.S. Cl.
CPC ............... *A41D 1/002* (2013.01); *A41B 1/18* (2013.01); *A41D 27/08* (2013.01); *A41D 27/085* (2013.01); *G06F 1/163* (2013.01); *G06F 1/1652* (2013.01); *G06F 1/1654* (2013.01); *G09F 9/372* (2013.01); *G09F 21/02* (2013.01); *H01F 7/0215* (2013.01); *A41D 2400/48* (2013.01); *G09F 2021/023* (2013.01)

(58) Field of Classification Search
CPC ...... A41D 1/002; A41D 27/085; G09F 9/375; G09F 21/02–2021/023; G06F 1/163; G06F 1/1652; G06F 1/1654
See application file for complete search history.

(56) References Cited

U.S. PATENT DOCUMENTS 9,116,667 B1 * 8/2015 St. Louis .............. G06F 1/163
2003/0213045 A1 11/2003 Fuentes
(Continued)

FOREIGN PATENT DOCUMENTS

DE 44 08 951 A1 9/1994
DE 299 15 010 U1 3/2000
DE 101 48 821 A1 4/2003

OTHER PUBLICATIONS

Written Opinion from FR1559557 application.

*Primary Examiner* — Ramon M Barrera
(74) *Attorney, Agent, or Firm* — Haverstock & Owens LLP

(57) ABSTRACT

The garment comprises a supple-sheet support (100) including a cut-out (102) formed in an apparent region. The electronic module (200) is a flat module arranged on the inner side of the support, which comprises a flexible circuit supporting electronic components and a display (206). The support (100) comprises, around the cut-out and the surface thereof opposite to the panel, a peripheral band carrying a first magnetization pattern with ranges magnetized alternatively with a given magnetic polarity and with a reverse magnetic polarity. The module (200) includes at the periphery (204) thereof a frame of similar dimensions carrying a second reverse magnetization pattern, conjugated with respect to the first magnetization pattern, when the module and the support are arranged opposite to each other in the overlapping peripheral region.

10 Claims, 4 Drawing Sheets

(51) Int. Cl.
*A41D 27/08* (2006.01)
*H01F 7/02* (2006.01)
*A41B 1/18* (2006.01)
*G09F 9/37* (2006.01)
*G09F 21/02* (2006.01)

(56) References Cited

U.S. PATENT DOCUMENTS

2010/0315367 A1 12/2010 Moy
2014/0267940 A1 9/2014 Ackerman
2014/0320247 A1 10/2014 Fullerton

* cited by examiner

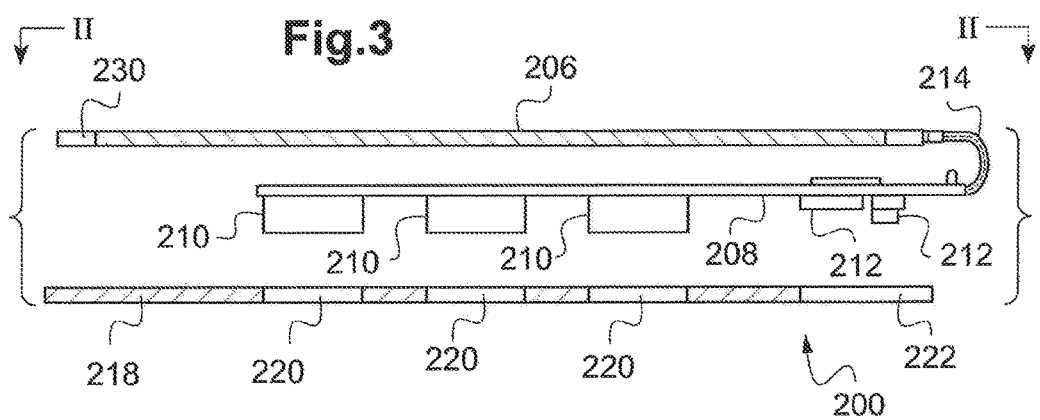
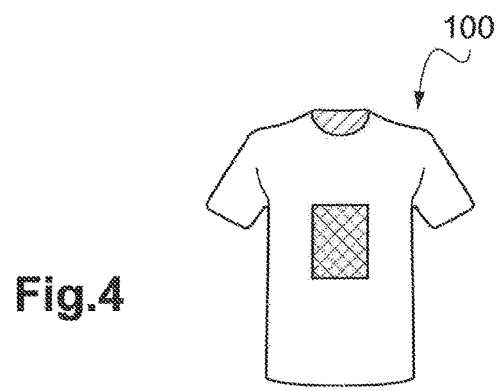
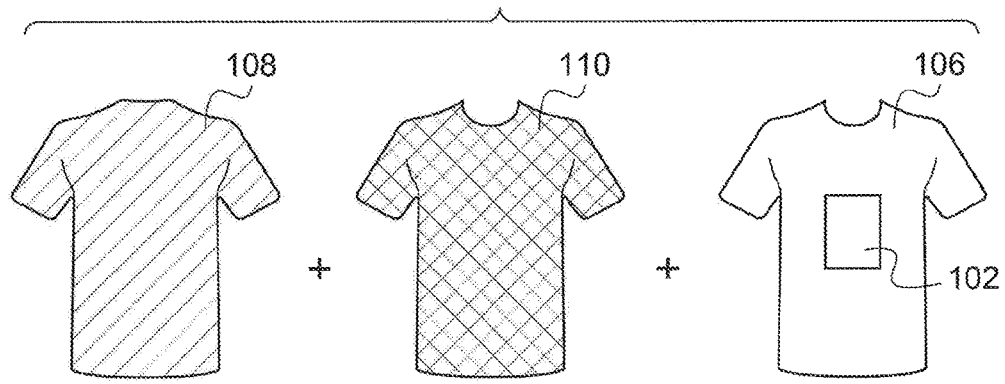

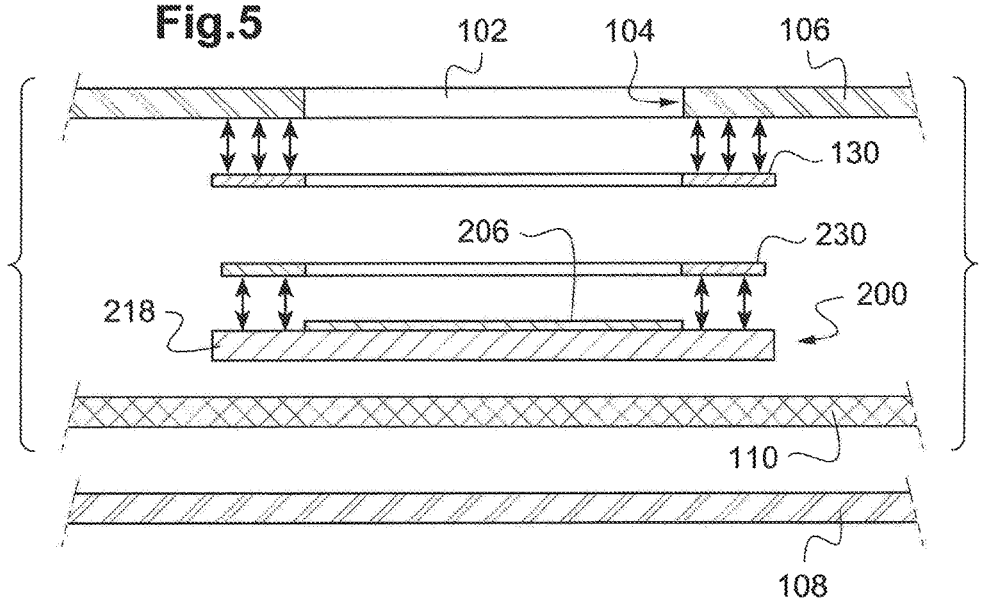
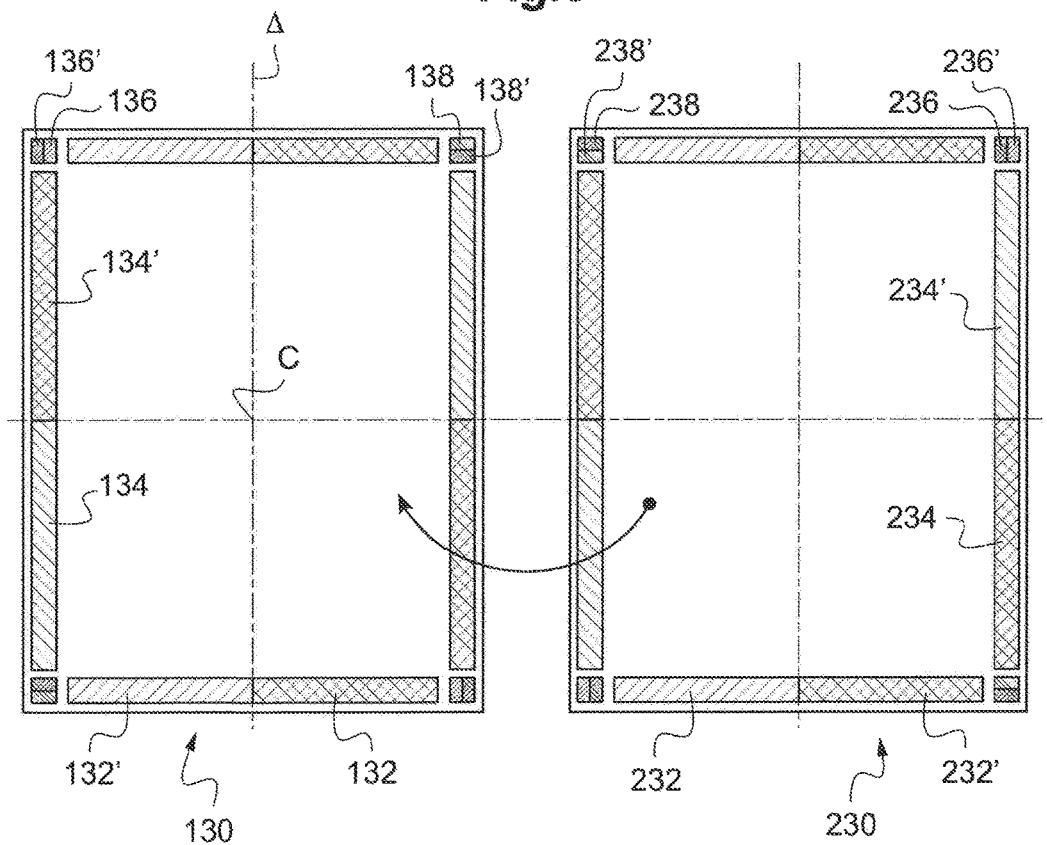

GARMENT COMPRISING A MODULE WITH A REMOVABLE ELECTRONIC DISPLAY, FASTENED TO THE GARMENT THROUGH SUPPLE MAGNETIC MEANS

The invention relates to the fastening of an electronic module on a supple-sheet support, in particular a textile material support, into which a cut-out has been formed in an apparent region, where the module is made visible. The electronic module is a flat module whose dimensions are slightly greater than those of the cut-out, and is intended to be mounted inside the garment in the region of the cut-out. This modules carries a display visible from the outside of the garment, through the cut-out, so as to display indications, of the graphic type or else, appearing on the garment in the same manner as if they had been printed thereon.

The module being fastened from the inside, only the screen of the display is visible through the cut-out, the peripheral regions of the display and the remaining of the module, as well as the means for fastening the latter to the garment, remaining hidden on the inner side of the garment.

US 2010/0315367 A1 describes such a configuration, in which the electronic module is arranged in the thickness of the large part of a tie, with in the middle a window letting appear the display. The module and the tie are made integral with each other through various suitable means, for example a magnetic fastening system.

The invention more particularly relates to the way to fasten an electronic module with a display to the garment to which it is intended, this garment being provided with a cut-out through which the display will be visible from the outside.

It will however be noted that, although the invention is mainly described within the framework of the fastening of a module to a garment, this fastening means purpose is not limitative, the invention applying as well to the fastening of a module to another supple-sheet support object such as a bag, a cap, etc.

Likewise, the supple-sheet support is not necessarily a support made of a textile material (fabric or knit), but may also be a support of continuous structure, for example a support made of a continuous layer of synthetic material, leather, etc.

In any case, it is desirable to have a system that allows fastening easily the module to the support and, conversely, to detach it therefrom with no difficulty and no risk of damaging the support.

It is also essential that the fastening system respects the suppleness of the support and the module, so as not to introduce undesirable additional stiffness in this fastening.

In the same order of idea, in order to optimize the integration of the module to the garment, the active surface of the display must level with the fabric of the garment over the whole periphery of the cut-out, which excludes too-thick and discontinuous fastening systems such as snap buttons, etc. This levelling must ideally be made, to within 1 mm, at the garment/display junction, and continuously over the perimeter of the cut-out.

Moreover, in the case of a garment, the module must be able to be separated from the support each time the garment is washed, then put back in place on the clean and ironed garment. The fastening system must hence allow such operations in a repeated and simple manner, and with no risk of degradation over time of the garment or of the fastening means.

It would also be desirable to be able to have a fastening system ensuring both an auto-alignment (immediate fastening in the good position, with no sliding) and foolproofing (fastening to support always in the good direction), without the user has to think or to search for positioning marks.

A fastening of the hook-and-loop band type would allow to respect the suppleness of the module/garment unit and, taking the thickness thereof into account, would not respect the requirement of low discontinuity at the place where the display levels with the cut-out edge.

Moreover, a repeated use of such a fixation would risk to damage the garment by tearing of the fabric, in particular for the finest fabrics. Furthermore, this type of fastening is uneasy to use if the hook-and-loop band extends over the whole periphery of the cut-out (which is desirable to avoid any gaping between the module and the garment). Moreover, it provides no simple foolproofing means allowing the positioning of the module and hence of the display in the good direction with respect to the cut-out.

The invention proposes a new mode of fastening a flexible electronic module to a supple-sheet support which solves the whose of these problems.

More precisely, the invention proposes for that purpose a unit comprising, in a manner known in itself, in particular from above-mentioned US 2010/0315367 A1: a supple-sheet support, in particular a textile support, including a cut-out formed in an apparent region; a flat electronic module, whose peripheral perimeter is similar to the perimeter of the cut-out and whose dimensions are greater than those of the cut-out so as to define with the latter an overlapping peripheral region, this module being arranged on an inner side of the support and comprising a circuit supporting electronic components and a display visible from an outer side of the support, through the cut-out; and magnetic means for attaching the module to the support when the module and the support are arranged opposite to each other in the overlapping peripheral region.

Characteristically of the invention, the circuit supporting electronic components and the display is a flexible circuit, and the support comprises, around the cut-out and at the surface thereof opposite to the panel, a peripheral band carrying a first magnetization pattern with ranges magnetized alternatively with a given magnetic polarity and with a reverse magnetic polarity. The module includes at the periphery thereof a frame, of dimensions similar to those of the peripheral band of the support, carrying a second magnetization pattern with ranges magnetized alternatively with a given magnetic polarity and with a reverse magnetic polarity. The second magnetization pattern is a reverse pattern, conjugated with respect to the first magnetization pattern, when the module and the support are arranged opposite to each other in the overlapping peripheral region.

According to various advantageous subsidiary characteristics:
  the cut-out and the peripheral band have a rectangular shape, and the support and the module carry, on at least two sides and/or on at least two adjacent vertices of the rectangle, a magnetization pattern comprising, for each of these sides or vertices, at least two magnetized ranges, one with said given magnetic polarity and the other with said reverse magnetic polarity;
  the support and the module carry respective magnetization patterns, non-symmetrical with respect to an axis of the rectangle;
  the magnetized ranges of the first and the second magnetization patterns each comprise a Halbach array with a configuration of bands magnetized successively in one direction and in the other, producing an anisotropic magnetic field essentially directed towards the contact between the support and the module;

the support is a weaved or knitted support defining at least one predominant direction, and the direction of the magnetized bands of the magnetization patterns forms an angle from 30° to 60° with respect to said predominant direction;

the peripheral band carrying the first magnetization pattern is a magnetized or magnetisable band, added by transfer to the support, or a band formed from a magnetisable powder laminated in the thickness of the support;

the magnetization of the first and second magnetization patterns is a magnetization with a controlled concentration of the magnetic flux able to produce over a short or a null distance an attraction of two ranges magnetized with conjugated polarities, and a repulsion of these same ranges beyond a distance greater than a given threshold.

An example of implementation of the present invention will now be described, with reference to the appended drawings in which the same references denote throughout the figures identical or functionally similar elements.

FIG. 3 is an exploded sectional side view, along III-III of FIG. 2, of the flexible module of FIG. 2.

FIG. 4 illustrates the different pieces of fabric to be assembled for making the garment of FIG. 1.

FIG. 5 is an exploded side view of the unit formed by the garment, the module and the means according to the invention for fastening the module to the garment.

FIG. 6 illustrates an exemplary embodiment of the fastening means allowing, thanks to suitable magnetization patterns, the implementation of the auto-alignment and foolproofing functions.

An exemplary embodiment of the invention will now be described.

Figure 1:
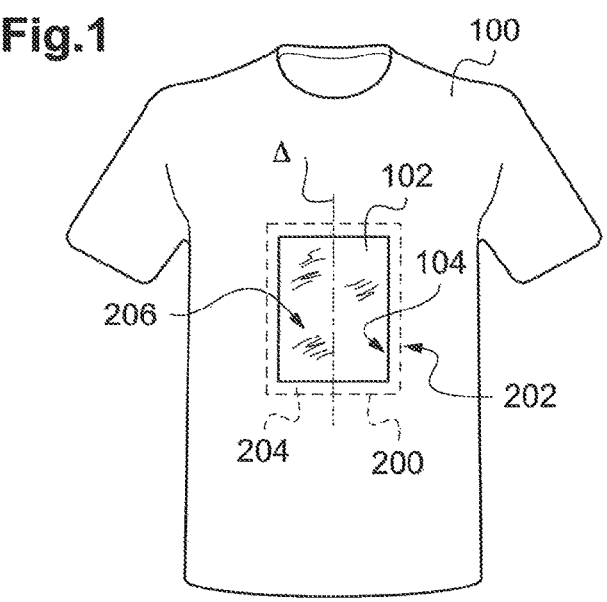
FIG. 1 is a general view of a garment integrating a module having a display visible on the front.

In FIG. 1, the reference 100 generally denotes a garment such as a tee-shirt, on the front of which has been formed a cut-out 102 to make an opening in the thickness of this tee-shirt, herein a rectangular opening. Advantageously, to allow a sharp and devoid-of-fraying cut of the edge 104, this cut-out is made by a technique such as a laser cut, the garment being in this case made of a synthetic material such as polyimide or acrylic.

A flexible electronic module 200 (described in more details, in isolation, in FIGS. 2 and 3) is mounted at the place of this cut-out 102, on the inner side of the garment. The outer peripheral edge 202 of the module 200 has a shape similar to that of the cut-out 102, with slightly greater external dimensions, so as to provide on the inner side of the garment, about the cut-out 102, an overlapping peripheral region 204 of substantially constant width.

The electronic module 200 may in particular support a display 206 visible from the outside, through the cut-out 102, this display having dimensions identical to those of the cut-out 102, or very slightly greater, so that only the active surface of the display 206 is visible through the cut-out 102.

This display 206 allows making appear on the front of the garment, at will according to the module programming, messages, logos, graphic signs, etc., in the same way as if those indications had been printed on the front of the garment, above all in the case of a display of the EPD (e-Paper Display) type, whose reflective properties are rather close to those of a paper or a fabric.

Figure 2:
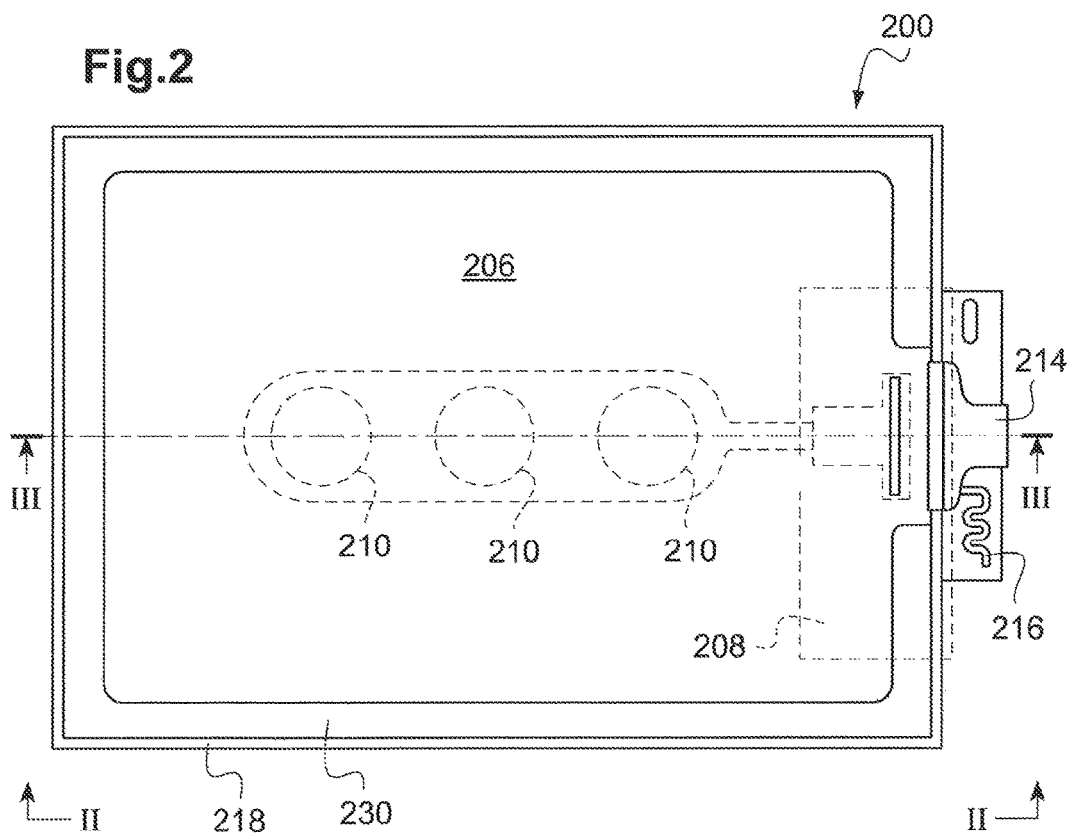
FIG. 2 is a top view, along II-II of FIG. 3, of the flexible module considered in isolation.

FIGS. 2 and 3 illustrate in top view and in exploded sectional view, respectively, the electronic module 200.

The latter includes a flexible printed circuit board PCB 208 supporting batteries 210 allowing making the module autonomous, as well as various components 212 such as: microcontroller, display controller, flash memory, movement sensor of the MEMS type or others, radio interface circuit of the Bluetooth low-energy BLE type, etc., allowing the implementation of all the electronic functions of the module 200.

The flexible circuit board 208 is connected by a supple connector 214 to the display 206, the flexible connector being also able to support an RF antenna such as a Bluetooth antenna 216.

As regards the display 206, the latter is consisted of a flexible screen for example of the "e-Paper" type, which is a technology providing at once a very small thickness (of the order of 0.8 mm), a very good suppleness that allows deforming the screen with no risk of damage, as well as a low consumption, the holding of a fixe image requiring no energy supply.

On the side opposite to the display 206, the module 200 includes a foam back 218 comprising recesses 220, 222 housing the batteries 210 and the components 212.

Once these different elements assembled together, we have an electronic module 200 having a sufficient flexibility so as not to hamper the user when the module is mounted on the garment, of low thickness (lower than 3 mm) and low weight: lower than 80 g, preferably about 50 g for a module of typical dimensions 125×160 mm supporting a display 206 of 7 inches (178 mm).

The module also includes, on the side of the display 206 and around the latter, a magnetic peripheral frame 230 that will allow the fastening of the module 200 to the garment, as will be described hereinafter. The peripheral frame 230 is for example fastened about the display 206 by bonding on the foam back 218 by means of a suitable adhesive. The magnetic peripheral frame 230 has a thickness of the same order as that of the display 206, so that the apparent outer surface thereof, turned towards the front part 106 of the garment, levels with the display 206 and hence provides an optimum continuity, the less perceptible possible, between the different constitutive elements.

FIG. 4 illustrates the different pieces of fabric to be assembled together for making the garment 100. The latter is made from a pattern draft comprising a front part 106 in which has been formed the cut-out 102, a back part 108, and a front liner 110 to avoid the direct contact of the module 200 with the user's skin when this module is mounted on the front part 106. These various parts are made from a textile sheet material, weaved or knitted, prepared in a conventional manner.

FIG. 5 illustrates an exploded view of the unit formed by: the garment 100 of FIG. 4 with the different parts 106, 108, 110 thereof; the electronic module 200; and the magnetic means 130, 230 for fastening the module 200 to the garment 100. In this FIG. 5, the respective proportions between the thicknesses of the different elements have not been respected, in order to improve the readability thereof.

The module 200 is, as indicated, provided with a magnetic peripheral frame 230, carrying, on the side turned towards the inner face of the front part 106 of the garment 100, a first predetermined magnetization pattern.

The garment 100 carries, for its part, on the inner face of the front part 106, about the cut-out 102, a magnetic peripheral band 130 carrying a second magnetic pattern, reverse of the magnetization pattern of the peripheral frame 230 of the module 200.

FIG. 6 illustrates examples of magnetization patterns respectively formed on the peripheral band 130 of the garment and on the peripheral frame 230 of the module, these respective patterns being reversed patterns, conjugated between each other when the module 200 and the garment 100 are arranged opposite to each other with the magnetic frame 230 of the module flattened against the magnetic peripheral band 130 of the garment. By "reversal" of the magnetization pattern, it is to be understood a South/North magnetic polarity reversal. By "conjugated patterns", it is meant that a point of the magnetic pattern of one of the elements 130, 230 is magnetized "South" when the counterpart point of the opposite other element 230, 130 is magnetized "North", and vice versa. This configuration of the respective magnetization patterns allows making an adherence by magnetic attraction between the two elements 130, 230 when these latter are flattened against each other.

In FIG. 6, the two different South/North polarizations are illustrated as simple and crossed hatchings, respectively, so as to be distinguished from each other.

To provide the auto-alignment and foolproofing function, the magnetization patterns are for example, as illustrated in FIG. 3, alternated patterns 132, 132' with 232, 232' and/or 134, 134' with 234, 234' on respective halves of each of the sides of the rectangular shape of the peripheral band 130 and of the peripheral frame 230.

This configuration allows in particular ensuring an auto-alignment of the two elements 130 and 230 relative to each other, the only fact to bring them closer to each other causing an adjustment of the respective positions thereof and hence, that way, a centering of the module 200, and hence of the display 206, with respect to the cut-out 102.

A foolproofing function may be ensured for example by placing in opposite corners magnetic patterns 136, 136' with 236, 236' and/or 138, 138' with 238, 238', which are not symmetrical with respect to the axis Δ of the rectangle, but symmetrical with respect to the centre C of this same rectangle. It consists for example in two North/South bands oriented lengthwise at one vertex of the rectangle, whereas at the adjacent vertex, they are oriented widthwise.

Various ways to make the magnetic peripheral band 130 of the garment 100 will now be exposed, as this band can be made in different manners.

A first technique implements a lamination method. In this context, this is a complete piece of fabric that is laminated, to then be cut (outer perimeter of the pattern draft and cut-out 102) for the final making of the garment in a later step. The previous lamination produces a fabric, a face of which shows the textile fibre and the opposite face of which is magnetisable. This technique can be used in particular for relatively thick fabrics, for materials such as leather, etc.

The lamination implements a powder comprising high-coercivity ferromagnetic particles, mainly consisted of ferric oxide, mixed up with a binder such as a chlorinated polyethylene or a thermoplastic polymer in a proportion of the order of 20%, to provide the finished product with the desired suppleness. This powder is laminated with the fabric, which comprises a synthetic (nylon, acrylic, etc.) and non-stretchable (no elastane) fibre.

The unit passes after lamination via a conveyor through a magnetization station producing a strong magnetic field providing the ferric face with the magnetic properties thereof.

Figure 7:
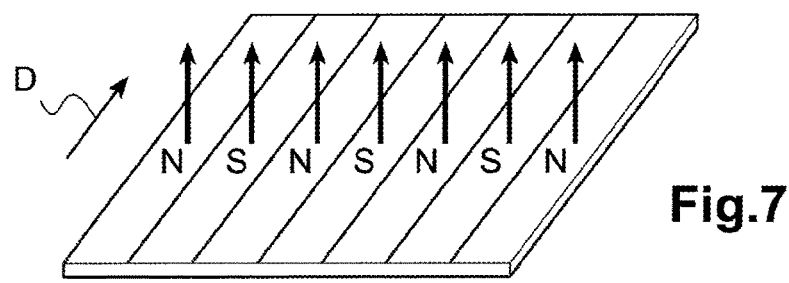
FIG. 7 illustrates the principle of a Halbach array.

Advantageously, as illustrated in FIG. 7, the magnetization is performed so as to produce a Halbach array, which is in the form of an alternation of bands alternatively magnetized North and South, the width of the bands being of the order of 5 to 6 mm. The ferric face then produces a directional and anisotropic magnetic field, i.e. the magnetic field is concentrated on the side of the ferric face and of almost zero on the opposite face of the fabric.

Once this magnetization performed, the piece of fabric is cut up and cut out, for example by laser cut, the dimensions and the shape of the cut-out corresponding to those of the display.

Figure 8:
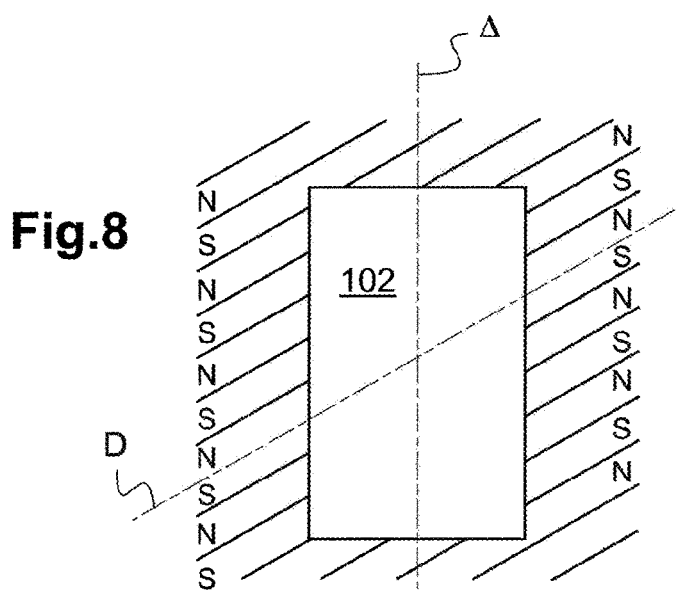
FIG. 8 illustrates the way the Halbach array of FIG. 7 is positioned and oriented with respect to the cut-out formed in the garment.

FIG. 8 illustrates a technique allowing compensating for the relative fragility of the laminated fabric after the making of the Halbach array.

Indeed, it is observed that the laminated and magnetized surface shows a fragility in the direction D (FIG. 7) of the alternated magnetization bands, with a risk of incipient tearing at this place, in the direction of the bands.

As illustrated in FIG. 8, to compensate for this drawback, the cut-out 102 is made slantwise with respect to the Halbach array, i.e. the main direction Δ of the cut-out forms an angle with respect to the direction D of the bands of alternated magnetization. This angle is typically of 30° to 60°, preferably about 45°. This slant with respect to the weft or stitch direction of the fabric provides a noticeably increased robustness, with a far less risk of fracture or cracking of the magnetized ferric layer at the back of the fabric.

A second technique of making the magnetic peripheral band 130 consists in proceeding by transfer of a previously made magnetic band, that is afterwards added to the back of the fabric. This technique can be used particularly advantageously for the thinnest and most supple fabrics.

The frame-shaped band must be thin enough (typical thickness of 0.25 mm to 0.50 mm) so that the unit keeps its suppleness without increasing too much the thickness (less than 1 mm in total) due to the addition of the magnetic band.

If the fabric as well as the magnetic band each include at least 15% of thermoplastic fibre, the two elements may be connected through ultrasonic welding techniques. In the contrary case, the transfer of the magnetic band to the fabric will be made by placing between these two elements a hot-melt glue that will mix up with the fibre of the fabric at the time of the passage under a hot press.

As in the previous case, it is advantageous to make the magnetic band with a magnetization according to a Halbach array, and the flux lines of the array of which show a slant with respect to the axes of the peripheral band.

Figure 9:
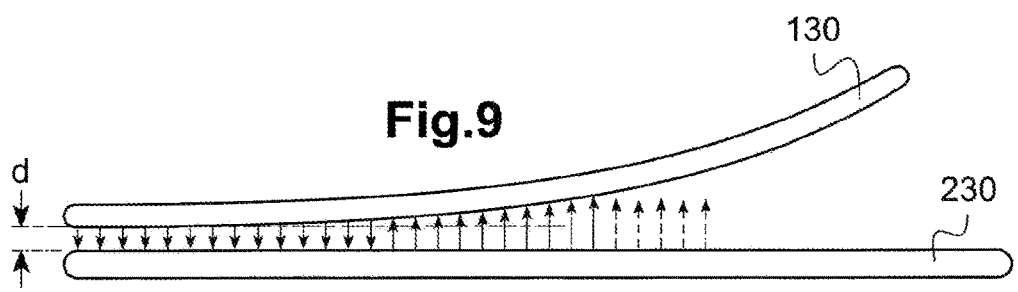
FIG. 9 illustrates an exemplary embodiment of the fastening means with a locking effect limited to a short distance between opposite surfaces.

FIG. 9 illustrates an improvement that can be implemented in complement of various techniques exposed hereinabove.

This improvement aims to compensate for a drawback coming from the fact that, if it is advantageous to have a magnetic field powerful enough to provide a good holding of the module to the garment, a too high field risks to damage or even to tear the fabric of the garment at the time of removal, if this fabric is fragile.

To reduce this risk, at the time of the magnetization of the elements 130, 230, it is contemplated to implement a technique of controlled concentration of the magnetic flux in the thickness of the magnetisable layer such as that described in U.S. Pat. No. 8,937,521 A. This type of magnetization provides, as illustrated in FIG. 9, a particular effect of locking allowing the two opposite surfaces to strongly adhere to each other at a programmable short distance d (of the order of 3 mm), but to repel each other as soon as the interval separating them is greater that this same distance. In other words, the distance d corresponds to a reversal between the attraction and repulsion phenomena, which allows separating more easily the module and the garment, without applying to the latter too much stresses that could over time produce a tearing.

The invention claimed is:

1. A unit, in particular a garment, comprising:
a supple-sheet support (100), in particular a textile support, including a cut-out (102) formed in an apparent region;
a flat electronic module (200), whose peripheral perimeter (202) is similar to the perimeter of the cut-out (102), and whose dimensions are greater than those of the cut-out so as to define with the latter an overlapping peripheral region (204), this module being arranged on an inner side of the support and comprising a circuit (208) supporting electronic components (212) and a display (206) visible from an outer side of the support, through the cut-out; and
magnetic means for attaching the module to the support when the module and the support are arranged opposite to each other in the overlapping peripheral region,
characterized in that:
the circuit (208) supporting electronic components (212) and the display (206) is a flexible circuit;
the support (100) comprises, around the cut-out at the inner side, a peripheral band (130) carrying a first magnetization pattern with ranges (132, 134, 136, 138) magnetized alternatively with a given magnetic polarity and with a reverse magnetic polarity; and
the module (200) includes at the periphery thereof a frame (230), of dimensions similar to those of the peripheral band of the support, carrying a second magnetization pattern with ranges (232, 234, 236, 238) magnetized alternatively with a given magnetic polarity and with a reverse magnetic polarity,
the second magnetization pattern being a reverse pattern, conjugated with respect to the first magnetization pattern, when the module and the support are arranged opposite to each other in the overlapping peripheral region.

2. The unit of claim 1, wherein the cut-out and the peripheral band have a rectangular shape, and wherein the support and the module carry, on at least two sides of the rectangle, a magnetization pattern comprising, for each of these sides, at least two magnetized ranges (132, 134; 232, 234), one with said given magnetic polarity and the other with said reverse magnetic polarity.

3. The unit of claim 1, wherein the cut-out and the peripheral band have a rectangular shape, and wherein the support and the module carry, on at least two adjacent vertices of the rectangle, a magnetization pattern comprising, for each of these vertices, at least two magnetized ranges (136, 138; 236, 238), one with said given magnetic polarity and the other with said reverse magnetic polarity.

4. The unit of claim 2, wherein the support and the module carry respective magnetization patterns, non-symmetrical with respect to an axis (Δ) of the rectangle.

5. The unit of claim 1, wherein magnetized ranges of the first and the second magnetization patterns each comprise a Halbach array with a configuration of bands magnetized successively in one direction and in the other, producing an anisotropic magnetic field essentially directed towards the contact between the support and the module.

6. The unit of claim 5, wherein the support is a weaved or knitted support defining at least one predominant direction (Δ), and wherein the direction (D) of the magnetized bands of the magnetization patterns form an angle from 30° to 60° with respect to said predominant direction (Δ).

7. The unit of claim 1, wherein the peripheral band carrying the first magnetization pattern is a magnetized or magnetisable band (130), added by transfer to the support.

8. The unit of claim 1, wherein the peripheral band carrying the first magnetization pattern is a band formed from a magnetisable powder laminated in the thickness of the support.

9. The unit of claim 1, wherein the magnetization of the first and second magnetization patterns is a magnetization with a controlled concentration of the magnetic flux able to produce over a short or a null distance an attraction of two ranges magnetized with conjugated polarities, and a repulsion of these same ranges beyond a distance greater than a given threshold (d).

10. The unit of claim 3, wherein the support and the module carry respective magnetization patterns, non-symmetrical with respect to an axis (Δ) of the rectangle.

* * * * *